(12) United States Patent
Sidoti et al.

(10) Patent No.: US 7,483,786 B1
(45) Date of Patent: Jan. 27, 2009

(54) METHOD AND SYSTEM FOR SELECTIVE ROUTE SEARCH ON SATELLITE NAVIGATORS

(75) Inventors: Stefano Sidoti, Rome (IT); Sandro Piccinini, Rome (IT); Marco Secchi, Rome (IT); Luigi Pichetti, Rome (IT)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/120,811

(22) Filed: May 15, 2008

(51) Int. Cl.
*G01C 21/00* (2006.01)
*G08B 1/00* (2006.01)

(52) U.S. Cl. .................. 701/201; 701/209; 235/435; 340/990; 340/995.13; 340/995.19; 340/426.16

(58) Field of Classification Search ............. 701/201, 701/209; 340/988, 990, 995.13, 995.18, 340/995.19, 572.1, 572.8, 572.7, 426.16, 340/5.65; 235/462.46
See application file for complete search history.

(56) References Cited

U.S. PATENT DOCUMENTS

| | | | |
|---|---|---|---|
| 5,031,104 A | | 7/1991 | Ikeda et al. |
| 5,103,400 A | * | 4/1992 | Yamada et al. ............ 701/202 |
| 5,177,685 A | | 1/1993 | Davis et al. |
| 5,410,485 A | | 4/1995 | Ichikawa |
| 5,559,707 A | | 9/1996 | DeLorme et al. |
| 5,802,492 A | | 9/1998 | DeLorme et al. |
| 5,892,463 A | * | 4/1999 | Hikita et al. ........... 340/995.13 |
| 5,948,040 A | | 9/1999 | DeLorme et al. |
| 6,064,941 A | | 5/2000 | Nimura et al. |
| 6,076,041 A | | 6/2000 | Watanabe |
| 6,101,443 A | | 8/2000 | Kato et al. |
| 6,119,066 A | | 9/2000 | Sugiura et al. |

(Continued)

FOREIGN PATENT DOCUMENTS

EP 1 296 303 A1 3/2003

(Continued)

OTHER PUBLICATIONS

Evans, J., et al., "Assessing the Use of GPS for Congestion charging in London" Traffic Engineering and Control, vol. 46, No. 3; pp. 89-105, 20050300.

(Continued)

*Primary Examiner*—Tuan C To
(74) *Attorney, Agent, or Firm*—Thorne & Halajian, LLP

(57) ABSTRACT

A method of operating a motor vehicle satellite navigation system using a motor vehicle's structure and characteristic information to calculate a best route to a desired destination. The method includes operating a graphical user interface (GUI), presenting display images for receiving input data for the desired destination and receiving satellite position data, and calculating a current location of the motor vehicle. The GUI presents a display image requesting motor vehicle structure and characteristic information. The method includes calculating and updating current best routes to a desired destination using map and POI databases comprising geographic coordinate grid and point of interest information from the current location and motor vehicle structure and characteristic information. The motor vehicle structure and characteristic information reflects static vehicle structure and characteristics such as size, fuel type, engine efficiency and fuel capacity, and dynamic information such as current fuel level and real-time traffic and road condition information.

1 Claim, 2 Drawing Sheets

U.S. PATENT DOCUMENTS

Figure 1:
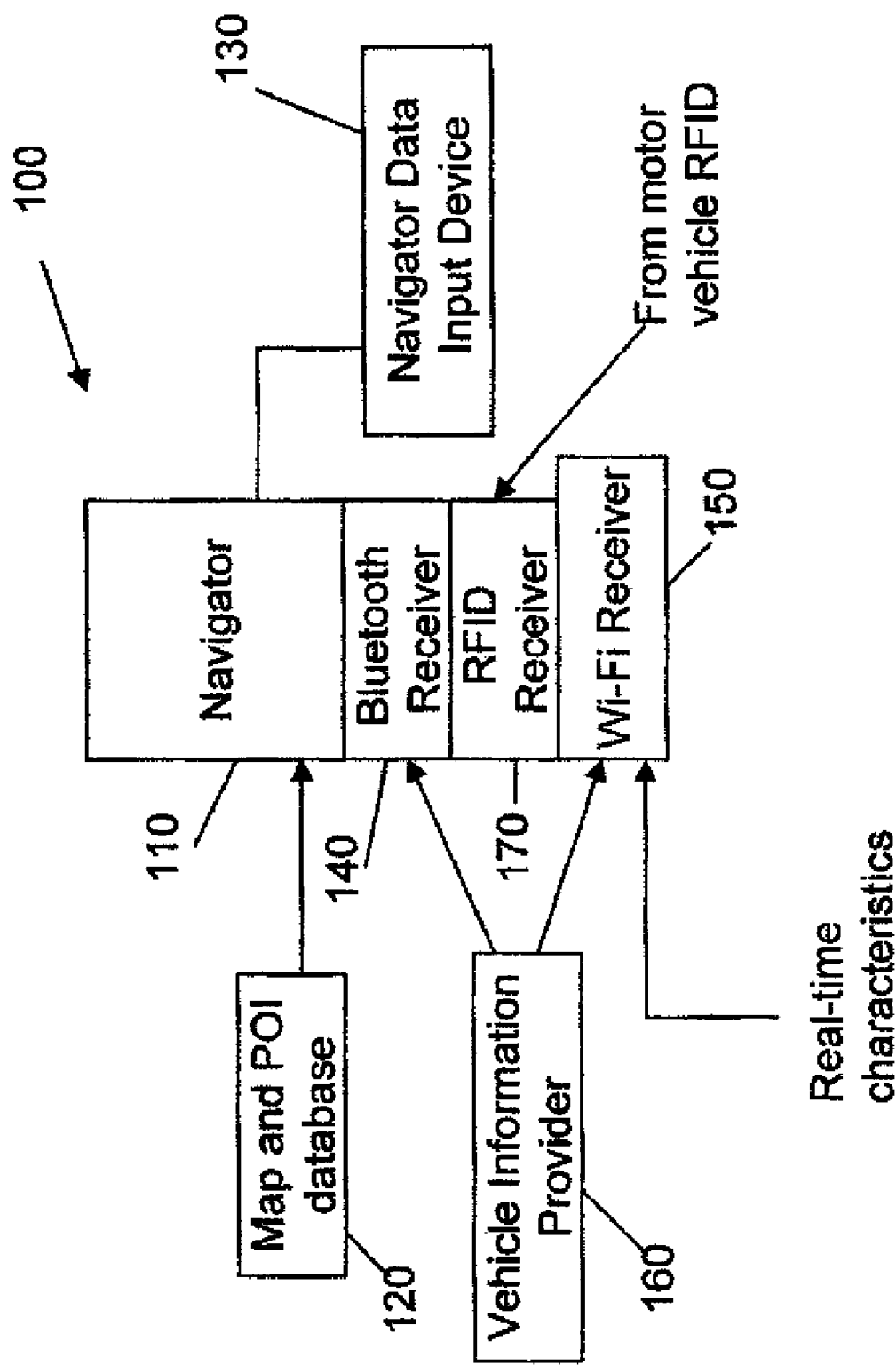

| | | | |
|---|---|---|---|
| 6,128,571 | A | 10/2000 | Ito et al. |
| 6,862,524 | B1 * | 3/2005 | Nagda et al. ............... 701/209 |
| 6,941,220 | B2 | 9/2005 | Le et al. |
| 2006/0007022 | A1 | 1/2006 | Endo et al. |
| 2006/0163350 | A1 * | 7/2006 | Melton et al. ............... 235/435 |
| 2006/0265124 | A1 * | 11/2006 | Ohler ......................... 701/209 |
| 2007/0038362 | A1 | 2/2007 | Gueziec |
| 2007/0244627 | A1 * | 10/2007 | Boss et al. .................. 701/117 |
| 2007/0271035 | A1 | 11/2007 | Stoschek et al. |
| 2007/0276596 | A1 | 11/2007 | Solomon et al. |
| 2007/0294028 | A1 | 12/2007 | Gray et al. |
| 2008/0033633 | A1 | 2/2008 | Akiyoshi et al. |
| 2008/0208445 | A1 * | 8/2008 | Bolton et al. ............... 701/201 |

FOREIGN PATENT DOCUMENTS

| | | | |
|---|---|---|---|
| JP | 10197265 | A * | 7/1998 |
| JP | 2003262524 | A * | 9/2003 |
| JP | 2004156995 | A * | 6/2004 |
| WO | WO 2008/019885 | | 2/2008 |

OTHER PUBLICATIONS

Kantowitz, BH, et al., "Advanced Traveler Information System and Commercial Vehicle Operations Components of the Intelligent Transportation Systems: On-Road . . . " Mar. 1998.

K.Z.Haigh, et al., "Route Planning and Learning from Execution," School of Computer Science, Carnegie Mellon Univ., http://citeseerx.ist.psu.edu/viewdoc/summary?doi=10.1.1.40.

Pi-Ming Cheng, et al., "Evaluation of NDGPS For Assessing Road User Charges," http://citeseerx.ist.psu.edu/viewdoc/summary?doi=10.1.1.74.1182, Nov. 15, 2003.

* cited by examiner

METHOD AND SYSTEM FOR SELECTIVE ROUTE SEARCH ON SATELLITE NAVIGATORS

FIELD OF THE INVENTION

The present invention relates to satellite navigation systems, and in particular to a motor vehicle satellite navigation system that calculates a best route for the particular motor vehicle in which it is installed or included by use of information related to the particular motor vehicle structure and characteristics and road information.

BACKGROUND OF THE INVENTION

Motor vehicle (e.g., automobile) navigator systems (Navigators) are satellite-based navigation devices. Navigators include a global positioning system (GPS), and are very popular among motorists over the world because of their ease of use in enabling even the most unseasoned drivers to reach their destination through directions/maps provided by the Navigator. With a Navigator, users can jump into their car, or other motor vehicle, enter their desired destination into the Navigator and set off driving while leaving the Navigator to direct them with turn-by-turn instructions at junctions, roundabouts and so on to the final destination.

Navigators utilize a global positioning system (GPS) to determine their location within a few meters anywhere on the planet whether on land, sea or air. Navigators use this location information to display the users (the Navigator's) current location on a digital map by use of the location's corresponding to longitude and latitude positioning. Navigators generate digital maps and display various map images on a display device or display screen comprising the Navigator. Navigator users (e.g., drivers) viewing the image representation instantly know their exact location and heading.

Most commercially available Navigators, based on entered destination information, calculate a route to a desired destination based on some programmed routing criteria, such as shortest route or fastest route. Once a route is calculated, the user is directed by the digital maps presented in the display device, and in many cases verbal instructions are articulated to help the user follow the calculated route through its various scheduled links, e.g., roads and highways. For example, the Navigator may direct the user to "take the next left," or "take the third exit on the roundabout". Moreover most commercially available Navigators include helper features. For example, a Navigator can include a function that provides the user an option of seeing digital map views, or map images that are rendered two dimensions (2D) or in three dimensions (3D).

Navigators can include a feature for varying day and night mode operation. With the feature, under darker road (current location) conditions, the balance of brightness's in the color pixels comprising the digital maps presented are modified to be less intrusive. Another known feature includes providing a user with an ability to select a Place of Interest (POI) from a built-in list of attractions and other useful locations such as gasoline or petrol stations, restaurants and hotels. The locations of the POIs are presented in the various map images calculated and displayed with the varying directional views as the motor vehicle traverses the various links comprising the calculated route.

While certainly a benefit to motor vehicle navigation, Navigators are not without shortcomings, or problems. Navigator functions for calculating routes to an entered destination rely on map coordinate and geographic information, e.g., current location and POI information. Navigators are known to schedule or propose unsuitable links within a calculated route, instructing drivers to travel on roads or highways that are inappropriate for the motor vehicle or for the user under Navigator direction. A conventional Navigator in a large truck could direct the truck driver to travel along improper links or roads for such a large motor vehicle, for example, one that includes "too low" bridges, or a road or crossing that is too narrow for the some characteristics of the motor vehicle, or lorry. Navigator instructions directing a truck along a truck-unfriendly link within a calculated route can cause traffic congestion and worse, collisions with the "too low" structures, etc.

SUMMARY OF THE INVENTION

A system and method according to inventive principles addresses the above and other deficiencies and related problems.

The invention comprises a satellite-based motor vehicle navigator (Navigator), and method for using a Navigator to selectively calculate a best route to a desired destination for a motor vehicle in consideration of the identified motor vehicle structure and characteristic information. Motor vehicle structure and characteristic information comprises static information derived from manufacturer information, including height, maximum weight, length, engine size, fuel type, fuel capacity, engine type, and further comprises dynamic information including real time detected weight, real-time load specifications, real-time detected number of passengers, real-time amount of fuel used, real-time current available fuel, time of day, day of week, real-time state of roads, real-time traffic conditions, real-time scheduled stops. The motor vehicle structure and characteristic information is processed to calculate and recalculate best routes to a destination, using logical rules that would prevent recommending particular links where vehicle static characteristic information such as fuel type, weight, height, width, fuel capacity and number or wheels and axles, would render such links inappropriate, or most appropriate, and further qualified by real-time dynamic information, such as remaining fuel capacity, instant load, passengers, road closures, and real-time restrictions to motor vehicles by weight, fuel type, height, width, fuel capacity and number of wheels and axles, etc, The Navigator and method for using a Navigator calculate a best route to an entered destination based on the static and dynamic vehicle structure, and characteristics. Preferably, a set of real time dynamic vehicle structure and characteristics are acquired, the dynamic information including data like detected number of passengers, amount of used fuel, tires pressure and so on, and they can be retrieved querying the on-board computer. Once the best route is calculated based on the static and dynamic information, various digital map images are rendered and displayed as the driver progresses the best route. Different motor vehicles (with different static structure and characteristics) can have different routes proposed for the same start and end locations, e.g., a two-seat automobile and tractor trailer delivering live cattle. The Navigator system calculates a preferred route for a passenger car that could include a narrow bridge or street, which would not be included in a route to the same destination calculated for a tour bus or lorry, particularly in view of real-time dynamic information such as instant vehicular size restrictions, or road closings to different vehicles.

Fuel type for a particular vehicle structure (static information), and any associated limitations to routing based thereon are reflected in the best route calculated using by the inventive routing function. As all societies become more conscious of petroleum fuel consumption, some routes, particularly in world urban centers, are known to limit access to motor vehicles based on vehicle constructions, and characteristics. Hence certain roads, highways and/or geographic zones are only accessible to motor vehicles of particular structure, and characteristics, e.g., electrical and/or regular gas powered vehicles, or bi-fuel vehicles that use some combination of the two.

The Navigator and method of using a Navigator calculates best routes for bi-fuel vehicles that reflects that bi-fuel vehicles are used or required, and the actual fuel currently in use. So in an urban center where vehicular traffic is taxed, or limited to those vehicles constructed to use gas and petrol, such route through the limited access roads or zone would be proposed only if the method determines that type of fuel used by the bi-fuel vehicles is sufficient to pass through zones that do not have re-fueling station for the particular fuel and require the particular fuel. For example, if a zone or road requires or allows only electric cars, then the Navigator interrogated the current vehicle to determine if it has capability to function as an electric car, and if so, whether the batteries have enough charge to allow the current car to pass through the 'only electric car zone' without needing to charge or recharge the car batteries.

Upon arrival in the limited access zone, the user is alerted to switch to required vehicle fuel. Further, the Navigator monitors the car's fuel, e.g., the battery charge level in the case of electric cars, and dynamically determines and updates information provided to the user relating to the passage through the limited access zone. Thus, if there is too much traffic, and the battery charge drops below a threshold that may be dynamically determined based on the how long is the car expected to remain or traverse through the limited access zone, then the Navigator instruct the driver and/or recalculates the route so that the car exits the limited access zone sooner, and thus be able to use an alternate fuel, like gasoline and petrol to continue the journey and reach the desired destination. The Navigator is in communication with the on-board computer which has all the needed information about fuel data.

The Navigator uses GPS data to fix the motor vehicle's exact geographical location, and accesses a memory stored map database of geographic street routing coordinates and other geographic information referred to as attraction information. The Navigator user is directed according to the calculated best route. The best route is calculated using the static information and the dynamic information. A current best route is recalculated (i.e., updated) with changing vehicle current position, The recalculating and update processing, based on static information such as size, weight and fuel capacity will present a new best route wherein the dynamic information indicates whether the current best route would be problematic for the vehicle when processed in view of the static information.

BRIEF DESCRIPTION OF THE DRAWING FIGURES

An understanding of the present invention can be gained from the following detailed description of the invention, taken in conjunction with the accompanying drawings, wherein like reference numerals refer to like elements throughout.

Figure 2:
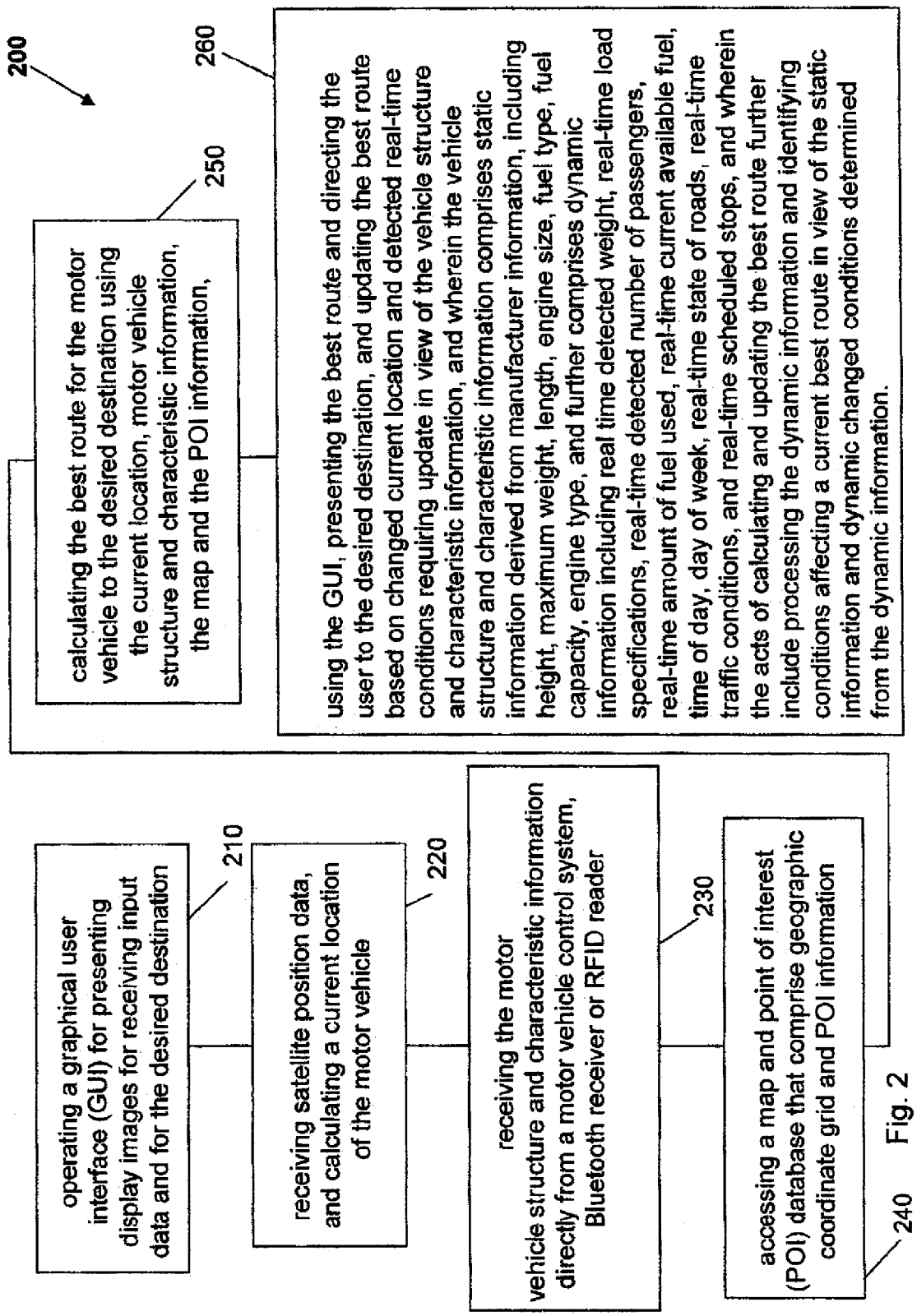

FIG. 1 is a schematic block diagram depicting a system level representation of a Navigator for calculating a best route for a destination based on the vehicle structure, and characteristics, and directing the vehicle along the best route; and FIG. 2 is a schematic flow diagram depicting a method for using a Navigator to calculate a best route to a destination based on the vehicle structure, and characteristics, and directing the vehicle along the best route.

DETAILED DESCRIPTION OF THE INVENTION

In a hardware embodiment, the invention comprises a vehicular satellite navigation system (Navigator) in a compact mechanical housing with a battery power supply, or connection to a vehicular power supply. The Navigator operates in accordance with a method for calculating a best route to a user destination that accounts for the motor vehicle structure and characteristics. A route is a series of streets, roads, junctures, bridges, bypasses, overpasses, underpasses, highways, expressways, freeways, etc. without limitation, separately linking a current motor vehicle (Navigator) location to an entered destination. Once a best route is calculated, the various street views directing the user are displayed as various map images, which include point of interest (POI) information if correlated to the current directional map coordinates, in a Navigator display device. Preferably, synthesized verbal instructions are also presented. The housing includes integrated electronics, memory comprising or storing a map and POI information database, a receiver, e.g., Bluetooth, Wi-Fi, RFID reader or port, storage for the static and dynamic structure and characteristic information, a GPS for acquiring positional data and a processor for controlling Navigator operation, a stored of a set of computer readable instructions that are readable by the processor, that when processed, implement the inventive method of using the Navigator. The hardware embodiment may be portable, as a pluggable Navigator component for motor vehicles, or may be hard wired into a motor vehicle by an original equipment manufacturer.

The vehicle structure and characteristics comprises static information derived from manufacturer information, including height, maximum weight, length, engine size, fuel type, fuel capacity, engine type, etc., without limitation, and further comprises dynamic information including real time detected weight, real-time load specifications, real-time detected number of passengers, real-time amount of fuel used, real-time current available fuel, time of day, day of week, real-time state of roads, real-time traffic conditions, real-time scheduled stops, without limitation. The motor vehicle structure and characteristic information may be entered by hand, via signals derived from the motor vehicle's RFID, via a hardwired connection by and between the motor vehicle on-board computer, or vehicle control system, if available, from a vehicle information provider carried on a Bluetooth or Wi-Fi signal. Alternatively, the motor vehicle structure and characteristic information may be provided and received by other known communication means, such as a portable memory device with USB connector to plug into the Navigator.

FIG. 1 herein depicts a motor vehicle satellite-based navigation system (100) of the invention. The navigation system comprises Navigator (110), a Map and POI database (120), and a Navigator Data Input Device (130). The data input device accepts data input from users for Navigator operation. The Navigator operates an interactive graphical user interface (GUI), accepting destination information, motor vehicle structure and characteristic information if available from no other input means, and other user input that may be required for normal operation. The interactive GUI is presented via a conventional Navigator display device, not shown in the drawing figure. The Map and POI database (120) is shown as a separate unit directly connected to the Navigator. The invention is not limited to the embodiment shown.

The Map and POI database may reside in a Navigator memory (not shown), where map geographical coordinate and POI information is stored and accessible, downloaded to memory by any known network communication means, for example, a real-time wireless Internet connection to the vehicular control system, which in turn communicates real-time vehicle structure and characteristic information to the Navigator. While the vehicle structure and characteristic information may be entered by hand, the information may be entered by any known means. For example, the Navigator may include a Bluetooth receiver and/or a transmitter, e.g., a transceiver (140) and/or Wi-Fi receiver (150) for receiving the vehicle structure and characteristic information from a vehicle information provider (160), and from other real-time characteristic information providers that provide real-time data that might affect a calculation for a route in view of the static and dynamic motor vehicle structure and characteristics. The information providers and vehicle control system provide dynamic motor vehicle structure and characteristic information. An RFID receiver (170) could be included for reading motor vehicle structure and characteristic information from an RFID, relied upon where no hardwire, Bluetooth or Wi-Fi connection is available for receiving static vehicle characteristic information from a static RFID, as well as dynamic information as it becomes available. It should be understood that a device including a receiver may also include a transmitter, thus a receiver or transmitter include a transceiver.

The Navigator and method for use can read an RFID for static characteristic information including vehicle length, height, weight in standard conditions, preferred fuel and so on. By use of Bluetooth communication, the Navigator need not be dedicated to a fixed vehicle structure, and characteristics, as necessary where the information is derived from a static RFID, or hand input. For that matter, the Navigator may be preprogrammed for a particular motor vehicle, the structure and characteristic information permanently memorized or "hard coded" in the device. A processor of the Navigator is configured to compare the vehicle structure and characteristic information with descriptions or rules related to the roads, such as rules related to limited access to only electric cars during certain hours, and the road descriptions may include the type and condition of the roads, such as roads having low overhead bridges, thus car or truck having a height greater than a predetermine value cannot use such a road, or roads that include construction, or are gravel road, thus not suitable for a low riding sport car. Such information may be dynamically updated and received from various sources, such as satellite, road antennas, service providers, the Internet and the like.

In a software embodiment, the invention comprises a method of use for a motor vehicle satellite-based (e.g., GPS) navigator system (Navigator), which utilizes motor vehicle structure and characteristic information to calculate a best route to the motor vehicle's programmed destination. Broadly, the inventive method includes receiving global positioning data and calculating a current motor vehicle location, inputting a destination location using an input device and Navigator GUI, inputting motor vehicle structure and characteristic information, using a map database of geographic street information, and point of interest (POI) information, calculating the best route.

The Navigator and method for using a Navigator can utilize different types of POI information, which is published in POI list form. For that matter, where available in real time, POI information may provide dynamic characteristic information that could affect motor vehicle route calculation, when processed in view of other motor vehicle structure and characteristic information. For example, a specific POI for a bridge can be pre-filled with a set of information about bridge characteristics, but such bridge characteristic information can be dynamically updated by the user, or a real-time information provider. Using the Navigator, a user can mark each POI with their preference, and user comments or metadata profiled by vehicle model (which is a characteristic). The exemplary POI with bridge characteristic information might state that 95% of users of vehicle model xyz have already chosen to use the bridge, since some date.

The calculating act includes processing the vehicle provider information, motor vehicle structure and characteristics, map and extended point of interest (POI) list with geographic coordinate information to calculate representative route maps enriched with bridge heights, street widths, traffic patterns, etc., ease of drivability of a particular street or highway link, and other available useful information, without limitation. The POI list and map database may be supplemented by downloads of real-time data, for example, by receiving a Wi-Fi or Bluetooth signal carrying the data, or via an Ethernet or Internet connection. The POI can be downloaded periodically from Internet when connected to the network as currently done, or in an advanced scenario by receiving BlueTooth or WiFi signal from sources nearby.

The clear advantage of such solution is that proposed routes are targeted for specific vehicles to increase the customer satisfaction and also to avoid critical situation of particular motor vehicles directed upon roads that are too narrow to pass through, highways in which the class of vehicle is restricted, etc. The benefits are readily apparent when used in rental vehicles, where a user will rent a vehicle make and model that is unfamiliar, and not likely to know vehicle structure and characteristics, or local travel limitations, rendering it more than likely that the user could end up being directed upon roads that are inappropriate for the vehicle structure and characteristics.

The Navigator uses GPS data to fix the motor vehicle's exact geographical location, and accesses a memory of stored map database of geographic street routing coordinates and other geographic information referred to as attraction information. The Navigator user is directed according to the calculated best route. The best route is calculated using the static information and the dynamic information. A current best route is recalculated (i.e., updated) with changing vehicle current position, The recalculating and update processing, based on static information such as size, weight and fuel capacity will present a new best route wherein the dynamic information indicates that the current best route would be problematic for the vehicle when processed in view of the static information.

For example, where the static information includes that a vehicle has a certain engine type with a fixed fuel burn rate, real-time dynamic information, i.e., road closed to certain vehicle type, or size, compels the Navigator to update or calculate a new best route. The Navigator, however, will calculate such new best route in view of further static and dynamic information. For example, in view of real-time remaining fuel (dynamic) and engine type and fuel capacity (static), and in view of the aforementioned road closure information (dynamic), the Navigator will direct the vehicle to avoid the closed road on a link or road of the new best route that reflects the instant fuel type needs in view of the present fuel level and instant distance to required fuel-type services (dynamic).

FIG. 2 depicts a flow diagram depicting a preferred method (200) of using a motor vehicle satellite-based (e.g., GPS) navigator system (200). The Navigator method uses a motor vehicle's structure and characteristic information to calculate a best route to a desired destination. An act of operating a graphical user interface (GUI) for presenting display images and for receiving input data for the desired destination is identified by block (210). An act of receiving satellite position data, and calculating a current location of the motor vehicle is identified by block (220). An act of receiving the motor vehicle structure and characteristic information directly from a motor vehicle control system, Bluetooth receiver or RFID reader, is identified by block (230). In a preferred embodiment the dynamic data are automatically retrieved by the on-board computer, rather than manually entered, including automatically downloaded periodically from Internet when connected to the network as currently done, or in an advanced scenario by receiving BlueTooth or WiFi signal from sources nearby.

An act of accessing a map and point of interest (POI) database that comprise geographic coordinate grid and POI information is identified by block (240). An act of calculating the best route for the motor vehicle to the desired destination is identified by using the current location, motor vehicle structure and characteristic information, the map and the POI information block (250); and an act of using the GUI, presenting the best route and directing the user to the desired destination, including updating the best route based on changed current location and detected changed real-time conditions requiring position update in view of the vehicle structure and characteristic information is identified as block (260). The vehicle structure and characteristic information comprises static information derived from manufacturer information, including height, maximum weight, length, engine size, fuel type, fuel capacity, engine type. The dynamic information include real time detected weight, real-time load specifications, real-time detected number of passengers, real-time amount of fuel used, real-time current available fuel, time of day, day of week, real-time state of roads, real-time traffic conditions, and real-time scheduled stops. The acts of calculating and updating the best route further include processing the dynamic information and identifying conditions affecting a current best route in view of the static information and dynamic changed conditions determined from the dynamic information.

The method includes that the vehicle structure and characteristic information includes fuel type length, height, weight and load, and wherein the map and POI information include a map of roads and descriptions related to the roads, the descriptions including type, requirement and condition of the roads. The method may embody a set of executable instructions in a form of an application program, including a computer program product, comprising a tangible storage medium readable by a processing circuit and storing the executable instructions for execution by the processing circuit for performing a method of operating a motor vehicle satellite navigation system (Navigator) using a motor vehicles structure and characteristic information to calculate a best route to a desired destination.

Although a few examples of the present invention have been shown and described, it would be appreciated by those skilled in the art that changes may be made in these embodiments without departing from the principles and spirit of the invention, the scope of which is defined in the claims and their equivalents.

What is claimed is:

1. A method of operating a motor vehicle satellite navigation system (Navigator) using motor vehicle structure and characteristic information to calculate a best route to a desired destination, comprising acts of:

operating a graphical user interface (GUI) for presenting display images and for receiving input data for the desired destination;

receiving satellite position data, and calculating a current location of the motor vehicle;

receiving the motor vehicle structure and characteristic information directly from a motor vehicle control system, Bluetooth transceiver or RFID reader;

accessing a map and point of interest (POI) database that comprise geographic coordinate grid and POI information;

calculating the best route for the motor vehicle to the desired destination using the current location, motor vehicle structure and characteristic information, the map and the POI information; and using the GUI, presenting the best route and directing the user to the desired destination, including updating the best route based on changed current location and detected changed real-time conditions requiring position update in view of the vehicle structure and characteristic information;

wherein the vehicle structure and characteristic information comprises each of static information derived from manufacturer information, including height, maximum weight, length, engine size, fuel type, fuel capacity, and engine type, and the vehicle structure and characteristic information further comprises each of dynamic information including real time detected weight, real-time load specifications, real-time detected number of passengers, real-time amount of fuel used, real-time current available fuel, time of day, day of week, real-time state of roads, real-time traffic conditions, and real-time scheduled stops, and wherein the acts of calculating and updating the best route further include processing the dynamic information and identifying conditions affecting a current best route in view of the static information and dynamic changed conditions determined from the dynamic information.

* * * * *